2,904,594

METHOD OF PRODUCING ALDEHYDES BY HYDROLYSIS OF ALDIMINES OBTAINED BY REDUCTION OF NITRILES

Henderikus Obias Huisman and Anne Smit, Weesp, Netherlands, assignors, by mesne assignments, to North American Philips Company, Inc., New York, N.Y., a corporation of Delaware No Drawing. Application September 13, 1956
Serial No. 609,537

Claims priority, application Netherlands
September 14, 1955

7 Claims. (Cl. 260—598)

It is known that nitriles can be reduced to obtain aldimines, which may be converted by hydrolysis into the corresponding aldehydes. For this purpose various reducing agents may be used. For the production of unsaturated aldehydes attention has been paid to lithiumaluminium hydride as a reducing agent. This reduction agent has the advantage that it does not affect the unsaturated bonds. The choice of this reducing agent for the said case has, however, various disadvantages, so that the production of aldehydes from nitriles in the said manner has hitherto been uninteresting. In certain cases the yield of the reaction remained below the expectations.

It has now been found that a stisfactory yield of aldehydes belonging to the mixed aliphatic-aromatic, mixed aliphatic-alicyclic and mixed aliphatic-heterocyclic series may be obtained if the corresponding nitriles are reduced by means of a di-alkyl aluminium hydride and the aldimine complex thus obtained is hydrolysed in an aqueous medium.

Examples of compounds according to the invention which may be converted into aldhydes are benzonitrile, cinnamic acid nitrile, β-ionylidene acetonitrile and vitamin A acid nitrile.

It is advantageous to carry out the reduction in the absence of oxygen. It is therefore carried out preferably in nitrogen. It is further important to keep the temperature low during the reduction. The temperature range, in which the reaction is performed satisfactorily, lies between −50° C. and +50° C. It is furthermore advisable not to use a greater quantity of reducing agent for the reaction than that required to obtain the aldimine complex from the nitrile group. For the reduction of 1 mol of nitrile use will preferably be made of about 1 mol of di-alkyl aluminium hydride. With other proportions of the reagents similar results are obtained, it is true, but the yield of aldehyde after hydrolysis of the aldimine complex is then lower.

Very good results are obtained by reduction with a di-alkyl aluminium hydride, of which the number of carbon atoms in each of the alkyl groups lies between 1 and 6, for example di-ethyl aluminium hydride, di-isobutyl aluminium hydride. It is desirable that the reduction should take place in an inert solvent. For this purpose use may, for example, be made of n-hexane, cyclohexane, benzene, toluene, or petroleum ether. As an alternative, the reaction may be carried out in aliphatic or cyclic ethers, for example, in di-ethyl-, methyl-ethyl-, di-isopropyl-, di-proply-ether, di-oxane, or tetrahydrofurane.

The reduction is particularly important for the production of β-ionylidene acetaldehyde and vitamin A aldehyde from β-ionylidene acetonitrile and vitamin A acid nitrile respectively by hydrolysing the aldimine complex which is formed as an intermediate phase during the reduction process.

The reaction product of nitrile and the reducing agent may be decomposed in the aldimine complex by adding moist ether. The aldimine complex may be decomposed by adding diluted, aqueous acid.

Examples (1) With exclusion of moisture, in a nitrogen atmosphere, whilst stirred constantly, a cooled solution of 14.2 gs. (0.1 mol) of di-isobutyl aluminium hydride in cyclohexane was added to a solution of 21.5 gs. (0.1 mol) of β-ionylidene acetonitrile in 150 mls. of cyclohexane, cooled to about 5° C. After the addition of the whole quantity the mixture was stirred further for half an hour at a higher temperature (about 35° C.). Then the reaction mixture was cooled (0° C.) and decomposed carefully by dripping in liquid diethyl ether and then water. The jelly thus obtained was dissolved by acidification with diluted $H_2SO_4$. The solution of the reaction product was separated out, washed with water and dried on $Na_2SO_4$. The solvent was distilled off and the crude β-ionylidene acetaldehyde was distilled in vacuo. Boiling point at 0.01 mm. was 101° C. to 104° C. The absorption spectrum of the distilled product in ethanol showed two maxima, i.e. at 275 m$\mu$ and 325 m$\mu$. The extinction was 12,200 and 14,600 respectively. By means of semi-carbazide acetate a solid substance was obtained therefrom, which melted subsequent to crystallisation from benzene at 193 to 196° C.

(2) 14.05 gs. (0.05 mol) of vitamin A acid nitrile were reduced in the manner described in Example 1 by means of 7.1 gs. (0.05 mol) di-isobutyl aluminium hydride. After the reaction mixture had been decomposed and acidified with $H_2SO_4$ the organic substance was extracted and dried on $Na_2SO_4$. Then the solvent was distilled off in vacuo. The crude, orange brown vitamin A aldehyde dissolved in ethanol, exhibited an absorption spectrum with a maximum at 382 m$\mu$=32,000. Part of it, converted with semi-carbazide acetate, provided the corresponding semi-carbazone. Subsequent to two crystallisations the derivative was pure and melted at 197° C. The absorption spectrum in chloroform exhibited a maximum at 385 m$\mu$=60,600.

What is claimed is:

1. A method of producing an aldehyde comprising the steps, reducing a nitrile selected from the group consisting of the benzonitrile, cinnamic acid nitrile, β-ionylidene acetonitrile and the vitamin A acid nitrile by reacting said nitrile with a lower dialkyl aluminum hydride in an organic solvent to form the corresponding aldimine and then hydrolyzing said aldimine in an aqueous medium to the corresponding aldehyde.

2. A method of producing an aldehyde comprising the steps, reducing a nitrile selected from the group consisting of the benzonitrile, cinnamic acid nitrile, β-ionylidene acetonitrile and the vitamin A acid nitrile by reacting said nitrile with a lower dialkyl aluminum hydride in an organic solvent under an oxygen free atmosphere to form the corresponding aldimine and then hydrolyzing said aldimine in an aqueous medium to the corresponding aldehyde.

3. A method of producing an aldehyde comprising the steps, reducing a nitrile selected from the group consisting of the benzonitrile, cinnamic acid nitrile, β-ionylidene acetonitrile and the vitamin A acid nitrile by reacting said nitrile with a lower dialkyl aluminum hydride in an organic solvent under an oxygen free atmosphere, at a temperature between about −50° C. and 50° C., to form the corresponding aldimine and then hydrolyzing said aldimine in an aqueous medium to the corresponding aldehyde.

4. A method of producing an aldehyde comprising the steps, reducing a nitrile selected from the group consisting of the mixed benzonitrile, cinnamic acid nitrile, β-ionylidene acetonitrile and the vitamin A acid nitrile reacting said nitrile with an equimolar quantity of a dialkyl aluminum hydride containing from 1 to 6 carbon atoms in the alkyl group in an organic solvent under an oxygen free atmosphere, at a temperature between about $-50°$ C. and $50°$ C., to form the corresponding aldimine and then hydrolyzing said aldimine in an aqueous medium to the corresponding aldehyde.

5. A method of producing an aldehyde comprising the steps, reducing a nitrile selected from the group consisting of the benzonitrile, cinnamic acid nitrile, β-ionylidene acetonitrile and the vitamin A acid nitrile by reacting said nitrile with an equimolar quantity of a dialkyl aluminum hydride containing from 1 to 6 carbon atoms in the alkyl group in an organic solvent selected from the group consisting of n-hexane, cyclohexane, benzene, toluene, petroleum ether, diethyl ether, methyl-ethyl ether, diisopropyl ether, dipropyl ether, dioxane and tetrahydrofurane under an oxygen free atmosphere, at a temperature between about $-50°$ C. and $50°$ C., to form the corresponding aldimine and then hydrolyzing said aldimine in an aqueous medium to the corresponding aldehyde.

6. A method of producing β-ionylidene acetaldehyde comprising the steps, reducing β-ionylidene acetonitrile by reacting the acetonitrile with an equimolar quantity of a dialkyl aluminum hydride containing from 1 to 6 carbon atoms in the alkyl group at a temperature between about $-50°$ C. and $50°$ C. in an organic solvent selected from the group consisting of n-hexane, cyclohexane, benzene, toluene, petroleum ether, diethyl ether, methyl-ethyl ether, diisopropyl ether, dipropyl ether, dioxane and tetrahydrofurane under an oxygen free atmosphere to form the corresponding aldimine and then hydrolyzing said aldimine in an aqueous medium to form β-ionylidene acetaldehyde.

7. A method of producing vitamin A aldehyde comprising the steps, reducing vitamin A acid nitrile by reacting the acid nitrile with an equimolar quantity of a dialkyl aluminum hydride containing from 1 to 6 carbon atoms in the alkyl group at a temperature between about $-50°$ C., and $50°$ C. in an organic solvent selected from the group consisting of n-hexane, cyclohexane, benzene, toluene, petroleum ether, diethyl ether, methyl-ethyl ether, diisopropyl ether, dipropyl ether, dioxane and tetrahydrofurane under an oxygen free atmosphere to form the corresponding aldimine and then hydrolyzing said aldimine in an aqueous medium to form vitamin A aldehyde.

References Cited in the file of this patent

UNITED STATES PATENTS 2,761,878    Huisman _____ Sept. 4, 1956

OTHER REFERENCES

Ziegler et al.: Angew. Chem., vol. 67, pp. 424–425 (1955).